though it is intended primarily to filter sunlight, to any desired angular position with respect to the driver of the vehicle and also longitudinally to adjust its position along the axis of rod 40.

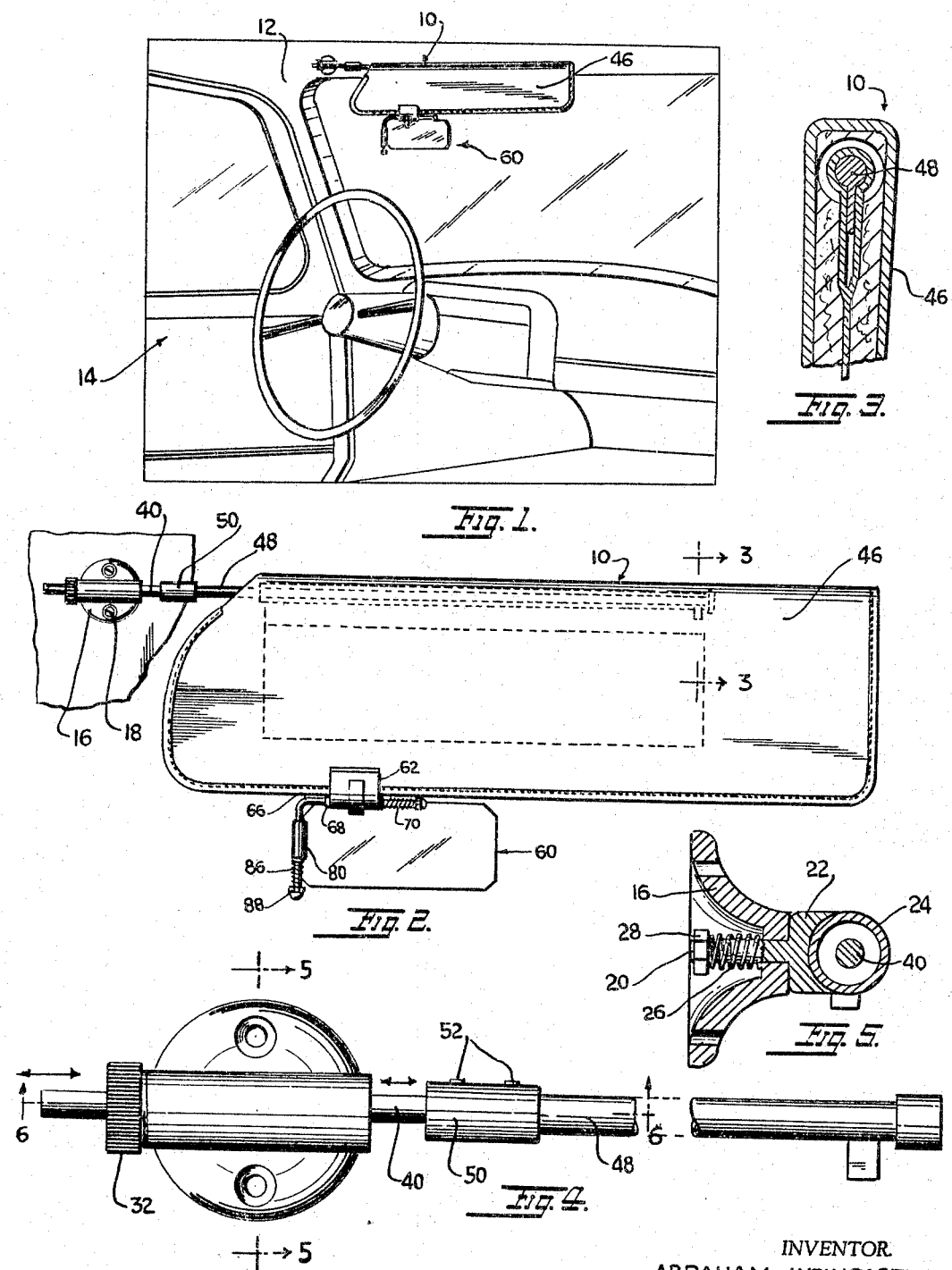

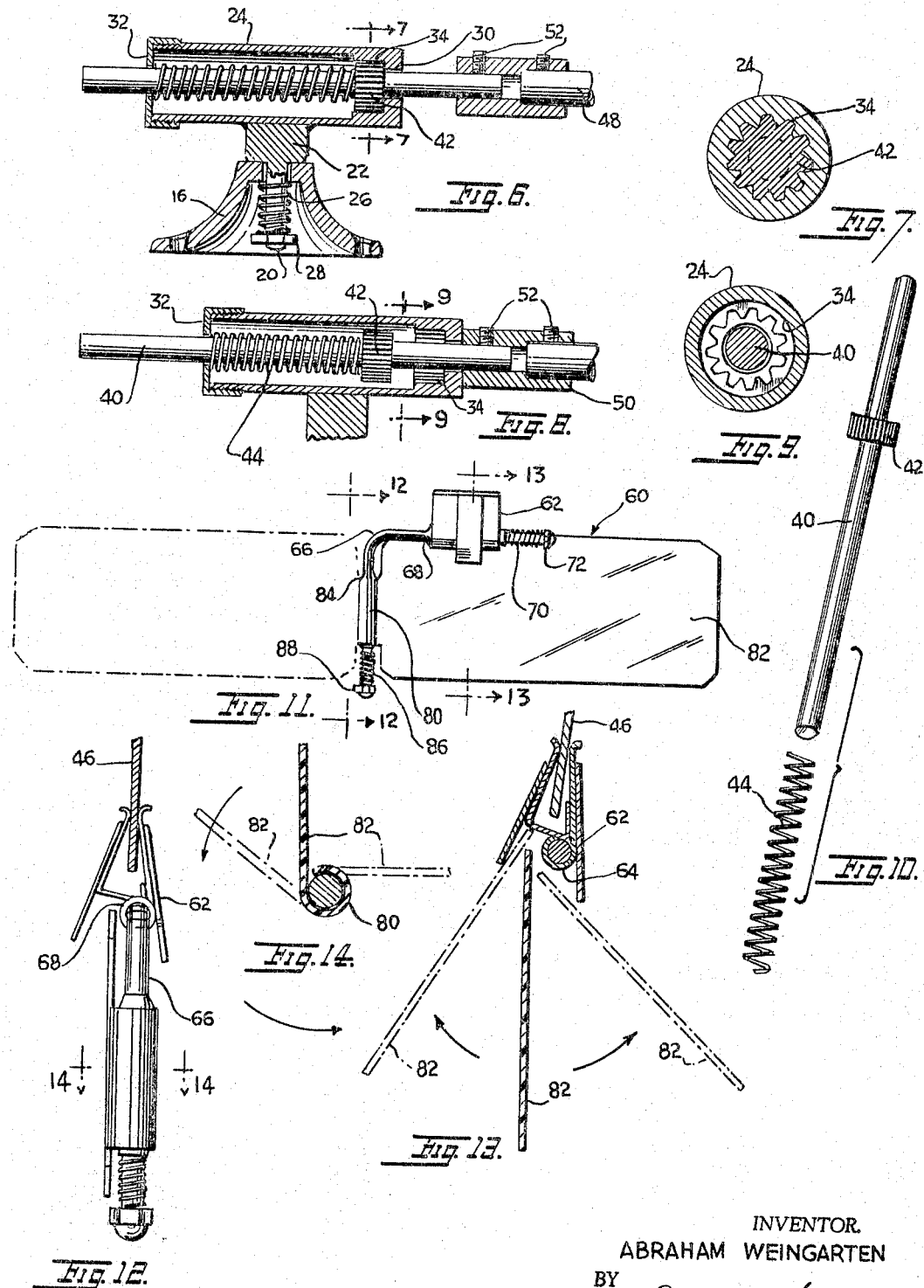

3,325,209

CLIP-ON LIGHT FILTER FOR SUN VISOR
Abraham Weingarten, 74—58 260th St.,
Glen Oaks, N.Y. 11004
Original application Mar. 12, 1964, Ser. No. 351,436, now Patent No. 3,261,638, dated July 19, 1966. Divided and this application July 18, 1966, Ser. No. 565,960
2 Claims. (Cl. 296—97)

This invention relates to the subject matter of my patent application Ser. No. 264,615 filed on Mar. 12, 1963, now Patent No. 3,201,170 issued Aug. 17, 1965. This application is a divisional of my co-pending patent application Ser. No. 351,436, filed Mar. 12, 1964, now Patent No. 3,261,638, issued July 19, 1966. The general objectives and purposes of the present invention correspond to those set forth in said patent applications.

Specifically, one important object of the present invention is the provision of positive-locking and quick-adjusting means for supporting a sun visor in any desired or selected position. Briefly stated, the sun visor is mounted on a rod having a toothed or serrated annular element which is fixed relative thereto. Said rod is supported within a sleeve which is swively mounted on a structural part of the vehicle. Within said sleeve is a toothed or serrated annular element which complements and cooperates with the toothed or serrated element on the rod. Said rod is movable both longitudinally and angularly within said sleeve, the longitudinal movement being for the purpose of causing engagement or disengagement of said toothed or serrated elements in order to lock or unlock the rod relative to the sleeve; the angular movement being for the purpose of changing or adjusting the angular position of the visor relative to the sleeve. A spring urges the two toothed or serrated elements into engagement with each other and it requires a manual effect opposed to the spring action to disengage said toothed or serrated elements.

An important feature of the invention resides in the fact that the above described locking and adjusting means may be installed in the place instead of an existing conventional visor supporting means and a conventional visor may be mounted on said locking and adjusting means by the use of an adapter or coupling.

A further object of this invention is the provision of a clip-on filter element which may be mounted on the visor proper and which may be swung into and out of operative position on said visor. Specifically, the clip-on device may be clipped on to the visor at any selected location thereon. The clip-on device includes an L-shaped bracket, one arm of which is swively connected to the clip, the filter element being swively connected to the other arm. The first mentioned arm of said L-shaped element will be disposed generally parallel to one of the side or end edges of the visor. The other arm will be disposed generally at right angles thereto. Since a swivelling action may take place about the axis of either or both arms, it will be apparent that the filter element may be swung both upwardly and downwardly as well as leftwardly and rightwardly to any desired position with respect to the line of sight of the driver of the vehicle.

The invention is illustrated in the accompanying drawing in which:

FIGURE 1 is a perspective view of the inside of a motor vehicle showing the visor mechanism and filter attachment herein described and claimed.

FIGURE 2 is an enlarged face view of said visor and filter attachment.

FIGURE 3 is an enlarged fragmentary section on the line 3—3 of FIGURE 2.

FIGURE 4 is an enlarged fragmentary view of the locking and adjusting means for supporting the visor.

FIGURE 5 is a sectional view on the line 5—5 of FIGURE 4.

FIGURE 6 is a fragmentary longitudinal sectional view on the line 6—6 of FIGURE 4.

FIGURE 7 is a transverse section on the line 7—7 of FIGURE 6.

FIGURE 8 is a view similar to that of FIGURE 6 but showing the toothed or serrated locking elements disengaged from each other.

FIGURE 9 is a cross sectional view on the line 9—9 of FIGURE 8.

FIGURE 10 is an exploded view of the visor-supporting rod and the spring which cooperates therewith.

FIGURE 11 is a plan view of the filter attachment which clips on to the visor.

FIGURE 12 is an end view in the direction of arrows 12—12 of FIGURE 11.

FIGURE 13 is a cross sectional view on the line 13—13 of FIGURE 11.

FIGURE 14 is a section on the line 14—14 of FIGURE 12.

Referring now to the details of the invention as illustrated in the drawing, it will be observed that a visor assembly 10 made in accordance with the present invention may be installed in conventional manner on a structural portion 12 of a motor vehicle 14. More specifically, a bell shaped mounting element 17 is secured to structural element 12 by means of screws 18 or other conventional fastening means. Rotatably secured to mounting 16 is a shaft 20 supporting a boss 22 having a sleeve 24 connected thereto. The boss bears against the outer end of mounting 16. A spring 26 mounted on shaft 20 bears against a shoulder formed in a recess on the inner side of said mounting 16. A nut 28 on said shaft 20 locks the spring to said shaft. It will be observed from the foregoing that sleeve 24 with its boss 22 may rotate about the longitudinal axis of mounting 16. The friction between boss 22 and said mounting, resulting from the action of spring 26, will tend to hold said sleeve and boss in place relative to said mounting.

Sleeve 24 has an annular flange 30 formed at one end thereof. A cap 32 is mounted at its opposite end and also provides an annular flange at that end. Cap 32 may be secured to sleeve 24 by any conventional means such as the screw threads shown in the drawing. Formed adjacent annular flange 30 is an annular toothed or serrated portion 34. Said annular flange 30, the annular flange provided by cap 32 and said toothed or serrated portion 34 are all concentric with each other.

A rod 40 extends through sleeve 24, being rotatably and slideably supported therein by annular flange 30 and cap 32. Secured to rod 40 is a toothed or serrated ring 42 which is engageable with the toothed or serrated portion 34 of the sleeve above mentioned. A spring 44 is mounted on rod 40 between cap 32 and toothed or serrated ring 42, the action of said spring being to urge the rod rightwardly as viewed in FIGURE 6. It will be noted that the toothed or serrated ring 42 is thereby caused to engage the toothed or serrated portion 34, locking rod 40 against rotary movement relative to sleeve 24. Said toothed or serrated ring 42 may be disengaged from the toothed or serrated portion 34 by manually forcing rod 40 leftwardly against the action of the spring to its FIGURE 8 position.

Visor 46 is mounted on supporting rod 48 in conventional manner. Supporting rod 48 may be coupled to above mentioned rod 40 by means of an adapter or coupling 50 and set screws 52. Once visor 46 is coupled to rod 40 the visor may be moved integrally with said rod 40 either longitudinally along the axis of said rod or angularly about said axis. It is therefore possible to adjust visor 46 to any desired position, both operative and inoperative and to lock it therein by means of the toothed or serrated members 34 and 42 respectively.

Filter attachment 60 includes a spring clip 62 which may be secured to visor 46 at any desired location along the lower side edge thereof or at any other convenient position thereon. Clip 62 is provided with a sleeve element 64 through which one arm of an L-shaped bracket 66 extends. An annular bead 68 is formed on said arm of the L-shaped bracket and it will be noted that it serves as a bearing with respect to one end of sleeve 64. A spring 70 mounted on said arm of the L-shaped bracket engages the opposite end of sleeve 64 and a nut 72 holds the spring in place. It is therefore possible for the L-shaped bracket to pivot about the longitudinal axis of sleeve 64, being frictionally held in any selected position about said axis by means of said spring 70.

The other arm of the L-shaped bracket 66 extends through a sleeve 80 formed at one end of a plastic filter element 82. An annular bead 84 is formed on said other arm of the L-shaped bracket to serve as a bearing with respect to one end of filter sleeve 80. A spring 86 mounted on the same arm of the L-shaped bracket bears against the opposite end of sleeve 80 and a nut 88 holds said spring in place. This arrangement makes it possible for filter element 82 to swivel about the longitudinal axis of its sleeve 80, sufficient friction being provided between said sleeve and annular bead 82, by means of spring 86, to hold said filter element in any selected angular position about said axis of sleeve 80.

It will appear from the foregoing that the visor and its clip-on filter element may be pivoted about a number of axes for almost universal positoning of both elements. Thus: visor 46 may pivot about the axis of shaft 20 and about the axis of rod 40; filter 82 may pivot about the axis of that arm of L-shaped bracket 66 which extends through sleeve 64 and also about the axis of the other arm of said L-shaped bracket which extends through sleeve 80.

The foregoing is illustrative of a preferred form of this invention and it will be understood that this form may be modified and other forms may be provided within the broad scope of the invention.

What is claimed is:

1. A sun visor for motor vehicles, comprising a mounting adapted to be secured to a structural part of a motor vehicle adjacent its windshield, a sleeve swivelly supported by said mounting, spring means acting between said sleeve and said mounting to cause sufficient frictional engagement between them to hold the sleeve in selected angular position relative to said mounting, a rod supported by said sleeve for axial and rotary movement relative thereto, a toothed ring in said sleeve, an annular flange in said sleeve at one end thereof and adjacent said toothed ring, a complementary toothed ring on said rod, a spring acting between said rod and said sleeve to urge said rod in one axial direction in order to cause inter-engagement between said toothed rings and thereby to lock said rod against angular movement relative to said sleeve, said annular flange limiting the movement of said rod in said axial direction such that said toothed rings do not disengage, said rod being manually movable in the opposite axial direction against the action of said spring in order to disengage said toothed rings from each other and thereby to permit angular movement of said rod to any selected position relative to said sleeve, and a visor secured to said rod, said visor being provided with light filter means adjustably secured thereto, said light filter means including an L-shaped supporting bracket, one arm of which is swivelly connected to said visor for angular movement about the longitudinal axis of said arm, the other arm of said L-shaped bracket having a sleeve rotatably mounted thereon and a filter element connected to said sleeve, the light filter means being adjustably supported on the visor by means of a spring clip and the spring clip being provided with a sleeve, the first mentioned arm of the L-shaped bracket being rotatably mounted within said sleeve, an annular shoulder formed on said first mentioned arm of the L-shaped bracket and engaging one end of said sleeve, and spring means acting between said first mentioned arm of the L-shaped bracket and the opposite end of said sleeve to maintain the first mentioned end of said sleeve and said annular shoulder in sufficient frictional engagement with each other to hold the L-shaped bracket in any selected angular position relative to said sleeve.

2. A sun visor for motor vehicles in accordance with claim 1, wherein an annular shoulder is formed on the second arm of the L-shaped bracket, one end of the sleeve on said second arm of the L-shaped bracket being engageable with said annular shoulder, and spring means acting between the opposite end of said sleeve and said second arm of the L-shaped bracket to maintain the first mentioned end of said sleeve in sufficient frictional engagement with said annular shoulder to hold said sleeve in any selected angular position relative to said second arm of the L-shaped bracket.

References Cited

UNITED STATES PATENTS

| 1,958,934 | 5/1934 | Williams | 296—97 X |
| 2,261,881 | 11/1941 | Horstmann | 296—97 |
| 3,261,638 | 7/1966 | Weingarten | 296—97 |

FOREIGN PATENTS 1,132,147  11/1956  France.

BENJAMIN HERSH, *Primary Examiner.*

J. A. PEKAR, *Assistant Examiner.*